United States Patent [19]

Fletcher

[11] 4,009,828

[45] Mar. 1, 1977

[54] ORGANIC NUCLEATING AGENT FOR BOTH WARM AND COLD CLOUDS

[75] Inventor: Aaron N. Fletcher, Ridgecrest, Calif.

[73] Assignee: The United States of America as represented by the Secretary of the Navy, Washington, D.C.

[22] Filed: Nov. 19, 1975

[21] Appl. No.: 633,191

Related U.S. Application Data

[63] Continuation of Ser. No. 581,063, May 27, 1975, abandoned.

[52] U.S. Cl. .............................. 239/2 R; 252/305; 252/319
[51] Int. Cl.² ...................................... A01G 15/00
[58] Field of Search ............ 239/2 R, 14; 252/305, 252/319, 359 A

[56] References Cited

UNITED STATES PATENTS

| | | | |
|---|---|---|---|
| 3,748,278 | 7/1973 | Kühne et al. | 252/319 |
| 3,899,129 | 8/1975 | Fukuta et al. | 239/14 |

*Primary Examiner*—Evon C. Blunk
*Assistant Examiner*—Michael Mar
*Attorney, Agent, or Firm*—R. S. Sciascia; Roy Miller; L. E. K. Pohl

[57] ABSTRACT

Methods for the dispersal of both warm and cold fogs with 1,1,1-tris-(hydroxymethyl)ethane. Warm fogs are dispersed by spraying hot aqueous solutions of the material into the fogged area. Cold fogs are dispersed by generating smokes containing submicron particles of the material and dispersing the smokes within the fogged area.

2 Claims, No Drawings

ORGANIC NUCLEATING AGENT FOR BOTH WARM AND COLD CLOUDS

This is a continuation of application Ser. No. 581,063, filed May 27, 1975.

BACKGROUND OF THE INVENTION

1. Field of the Invention

This invention relates to methods for dispersing both warm and cold fogs or clouds. More particularly, this invention relates to the use of 1,1,1-tris-(hydroxymethyl)ethane in dispersing both warm and cold fogs or clouds.

2. Description of the Prior Art

The art of attempting to modify the weather by causing rain to fall or fogs to disperse is an art in which there are many variables. There are many variables because no two clouds or fogs are exactly alike. For example, some clouds may be above or below the freezing point of water (warm and cold clouds) and still others have both warm and cold areas.

At the present time, the most prevalent chemical methods of dispersing warm fogs use hydroscopic materials. In one method, a solution of urea and ammonium nitrate is sprayed into a warm cloud. This method works well but previously used hydroscopic materials have essentially no effect on cold fogs. That is, if a fog has both warm and cold areas, the urea-nitrate solution, for example, will not produce ice crystals in the cold areas. Also, if it is desired to disperse fogs around an airport or the like where some areas are cold and others are warm, it is necessary to use the hereinafter described cold fog method on the cold areas.

The most prevalently used cold fog method involves dispersing silver iodide particles into the cloud. This method has drawbacks in that silver iodide has essentially no effect on warm clouds, in that silver iodide is expensive by virtue of there being limited amounts of silver available and in that silver iodide is toxic to some small organisms. It would, accordingly, be desirable if some material which had the fog dispersal or rainmaking capabilities of silver iodide but not the drawbacks could be found. And it would be especially desirable if the material could also be used to disperse warm fogs.

Insofar as is known by the inventor, there does not exist (in the prior art) a material which can be used on both warm and cold fogs. Nor is the inventor aware of the use of the compound of this invention in the weather modification art.

SUMMARY OF THE INVENTION

According to this invention, 1,1,1-tris-(hydroxymethyl)ethane is used to disperse both warm and cold fogs. In warm fog dispersal, aqueous solutions of the ethane derivative are sprayed into the fog. In cold fog dispersal, particles of the ethane derivative are produced either by heating the material itself or by placing an aqueous solution of it on a hot surface. The resulting smoke is then blown into the fog to be dispersed.

DESCRIPTION OF THE PRIOR ART

For purposes of this disclosure, the term warm fog may be defined as any fog or cloud having a temperature greater than $-5°$ C. A cold fog is then, of course, any fog or cloud having a temperature of less than $-5°$ C.

1,1,1-tris-(hydroxymethyl)ethane is a well known, readily available organic compound having the structure:

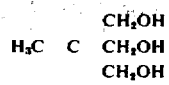

It may be obtained from any of a number of chemical firms. Therefore, a discussion of its preparation is unnecessary here.

To utilize 1,1,1-tris-(hydroxymethyl)ethane in dispersing a warm fog, one may follow a procedure similar to that set forth in the following example.

EXAMPLE 1

A saturated aqueous solution of 1,1,1-tris-(hydroxymethyl)ethane (at 40° C) was made up by dissolving the ethane derivative in water held at 40° C. This solution approximates 250 g of the ethane derivative per every 100 grams of water. The temperature of the solution was then raised to from 50° to 60° C and the solution was sprayed into a chamber at room temperature. The now solid particles were allowed to fall onto supercooled drops of water. Spraying was accomplished by means of a pressured sprayer of the type commonly used for agricultural or painting purposes. Droplets having diameters of from about 5 to 40 microns or larger of solidified material were obtained. About half of the supercooled water drops froze when they were at $-4°$ C. Since freezing point depression measurements indicate that about 12 grams of 1,1,1-tris-(hydroxymethyl)ethane would be soluble in 100 grams of water at $-1.6°$ C, then the reduced vapor pressure of drops of water saturated with 1,1,1-tris-(hydroxymethyl)ethane would cause them to grow at the expense of drops of liquid water of equal size, and thus clear warm fogs. This action was demonstrated in warm fogs primarily with submicron size particles as the larger sized spray particles fall too fast to be effectively evaluated in the small cold chambers available to us.

To disperse cold fogs, one may:

EXAMPLE 2

Either place 1,1,1-tris-(hydroxymethyl)ethane itself (the material is a white solid) on a hot surface to form a smoke or place an aqueous solution of the material on a hot surface to form a smoke and disperse the smoke into the cold ($-5°$ C or colder) cloud. Any heating apparatus capable of producing the necessary temperatures may be used to perform the heating step and any blower apparatus capable of dispersing the smoke may be used. Since apparatus which is already commonly in use may be used and since apparatus forms no part of this invention, a detailed discussion of apparatus will not be gone into here.

From the foregoing examples, it will readily be seen by those skilled in the art that one saturated solution of 1,1,1-tris-(hydroxymethyl)ethane could be made up and dispersed either in the form of droplets or as a smoke (by depositing the solution on a hot surface to evaporate the water and form the smoke from the material) depending on cloud temperature. In this way, one would realize the advantages of what are now two completely different systems.

1,1,1-tris-(hydroxymethyl)ethane is, insofar as is known by the inventor, a completely harmless, non-toxic material. It does not, insofar as is known, harm birds, mammals, fish or other small organisms. Nor is it harmful to plants. Solvents other than water could be used to dissolve the substituted ethane. Water is preferred because it is nonflammable, non-toxic, inexpensive, and does not interfere with the nucleation processes.

1,1,1-tris-(hydroxymethyl)ethane is especially advantageous for use in situations where it is desirable to cause rain from one cold cloud but undesirable to cause rain from another cold cloud a few miles away. It acts almost immediately in the area where it is dispersed and has little or no persistent effects which may be felt down range. It acts quickly (on a cold cloud) because it is not hydrophobic. Because it acts so quickly, it is important that it be dispersed in a suitable area of the cloud upon which it is to act. That is, an updraft cannot be relied upon to lift the material into a suitable area of a cloud as is often the case when silver iodide is used. Rather, it is preferable, to disperse the smoke directly at the elevation in the cloud where the temperature is suitable.

I claim:
1. In a method for dispersing a fog, wherein particles of a nucleating material are distributed in said fog to cause the fog to form droplets which fall in the form of precipitation, the improvement residing in preparing and distributing as said nucleating material particles of 1,1,1-tris (hydroxymethyl) ethane, said particles being distributed in the form of droplets having diameters from about 5 to about 40 microns if the temperature is greater than minus five degrees centigrade and said particles being distributed in the form of smoke particles if the temperature of the fog is less than minus five degrees centigrade.

2. In a method according to claim 1, the further improvement residing in forming said droplets or smoke from a saturated solution of 1,1,1-tris (hydroxymethyl) ethane prepared at a temperature of forty degrees centigrade.

* * * * *